US010423239B2

(12) United States Patent
Lin et al.

(10) Patent No.: US 10,423,239 B2
(45) Date of Patent: Sep. 24, 2019

(54) KEYBOARD ASSEMBLY

(71) Applicant: Sunrex Technology Corp., Taichung (TW)

(72) Inventors: Shun-Pin Lin, New Taipei (TW); Hsing-Kuang Chen, Taichung (TW)

(73) Assignee: SUNREX TECHNOLOGY CORP., Taichung (TW)

(*) Notice: Subject to any disclaimer, the term of this patent is extended or adjusted under 35 U.S.C. 154(b) by 21 days.

(21) Appl. No.: 15/937,007

(22) Filed: Mar. 27, 2018

(65) Prior Publication Data

US 2019/0094984 A1     Mar. 28, 2019

(30) Foreign Application Priority Data

Sep. 26, 2017 (TW) .............................. 106132917 A

(51) Int. Cl.
*G06F 3/02*     (2006.01)
(52) U.S. Cl.
CPC .............. *G06F 3/0219* (2013.01); *G06F 3/02* (2013.01)
(58) Field of Classification Search
CPC ...... G06F 1/1616; G06F 3/038; G06F 1/1683; G06F 2203/04105; G06F 3/0219; G06F 3/02; H01H 13/70
See application file for complete search history.

(56) References Cited

U.S. PATENT DOCUMENTS

| 2004/0004559 | A1  | 1/2004 | Rast |
| 2007/0108034 | A1* | 5/2007 | Rix ..................... G06F 3/0202 200/520 |
| 2013/0062177 | A1* | 3/2013 | Shih .................... G06F 3/0202 200/5 A |

FOREIGN PATENT DOCUMENTS

| TW | I501114 B  | 9/2015 |
| TW | M509969 U  | 10/2015 |

OTHER PUBLICATIONS

A Search Report appended to an Office Action issued to Taiwanese counterpart application No. 106132917 by the TIPO dated Sep. 6, 2018.

* cited by examiner

*Primary Examiner* — Premal R Patel
(74) *Attorney, Agent, or Firm* — Birch, Stewart, Kolasch & Birch, LLP

(57) ABSTRACT

A keyboard assembly includes a chassis formed with a plurality of cavities, a key unit including a plurality of key modules, and a scanning unit. Each key module is mounted in a respective one of the cavities, and has an individual resonant frequency. The scanning unit emits a detecting signal repeatedly, where a frequency of the detecting signal in each repetition being a different one of a plurality of scanning frequencies. The scanning unit and the key modules are configured such that, for each key module, when the frequency of the detecting signal is one of the scanning frequencies that matches the individual resonant frequency of the key module, the key module reaches electromagnetic resonance and the scanning unit acquires a response signal corresponding to the key module in response to the electromagnetic resonance.

10 Claims, 4 Drawing Sheets

KEYBOARD ASSEMBLY

CROSS-REFERENCE TO RELATED APPLICATION

This application claims priority to Taiwanese Patent Application No. 106132917 filed on Sep. 26, 2017.

FIELD

The disclosure relates to a keyboard assembly, more particularly to a keyboard assembly with customizable layout.

BACKGROUND

A keyboard is a common input device for a computer, and the commercially available keyboards usually employ a QWERTY based layout derived from a typewriter. However, such layout may not be suitable for users using languages other than English. Thus the layout of a conventional keyboard can be redefined or customized within an operating system of the computer by reconfiguring an operating system keyboard driver or with use of a software application to change respective correspondences between key codes generated by pressing keycaps of the keyboard and characters/symbols/commands to be output.

SUMMARY

Therefore, an object of the disclosure is to provide a keyboard assembly of which a layout may be customized without requiring reconfiguration of the operating system keyboard driver.

According to one aspect of the disclosure, a keyboard assembly includes a chassis, a key unit and a scanning unit. The chassis is formed with a plurality of cavities. The key unit includes a plurality of key modules. Each of the key modules is mounted in a respective one of the cavities and has an individual resonant frequency corresponding to a respective one of a plurality of key codes which are different from one another. The scanning unit is mounted in the chassis and is configured to emit a detecting signal repeatedly, where a frequency of the detecting signal in each repetition is a different one of a plurality of scanning frequencies. The scanning unit and the key modules are configured such that, for each of the key modules, when the frequency of the detecting signal is one of the scanning frequencies that matches the individual resonant frequency of the key module, the key module reaches electromagnetic resonance and the scanning unit acquires a response signal corresponding to the key module in response to the electromagnetic resonance of the key module, and records a frequency of the response signal, which is substantially equal to the one of the scanning frequencies.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
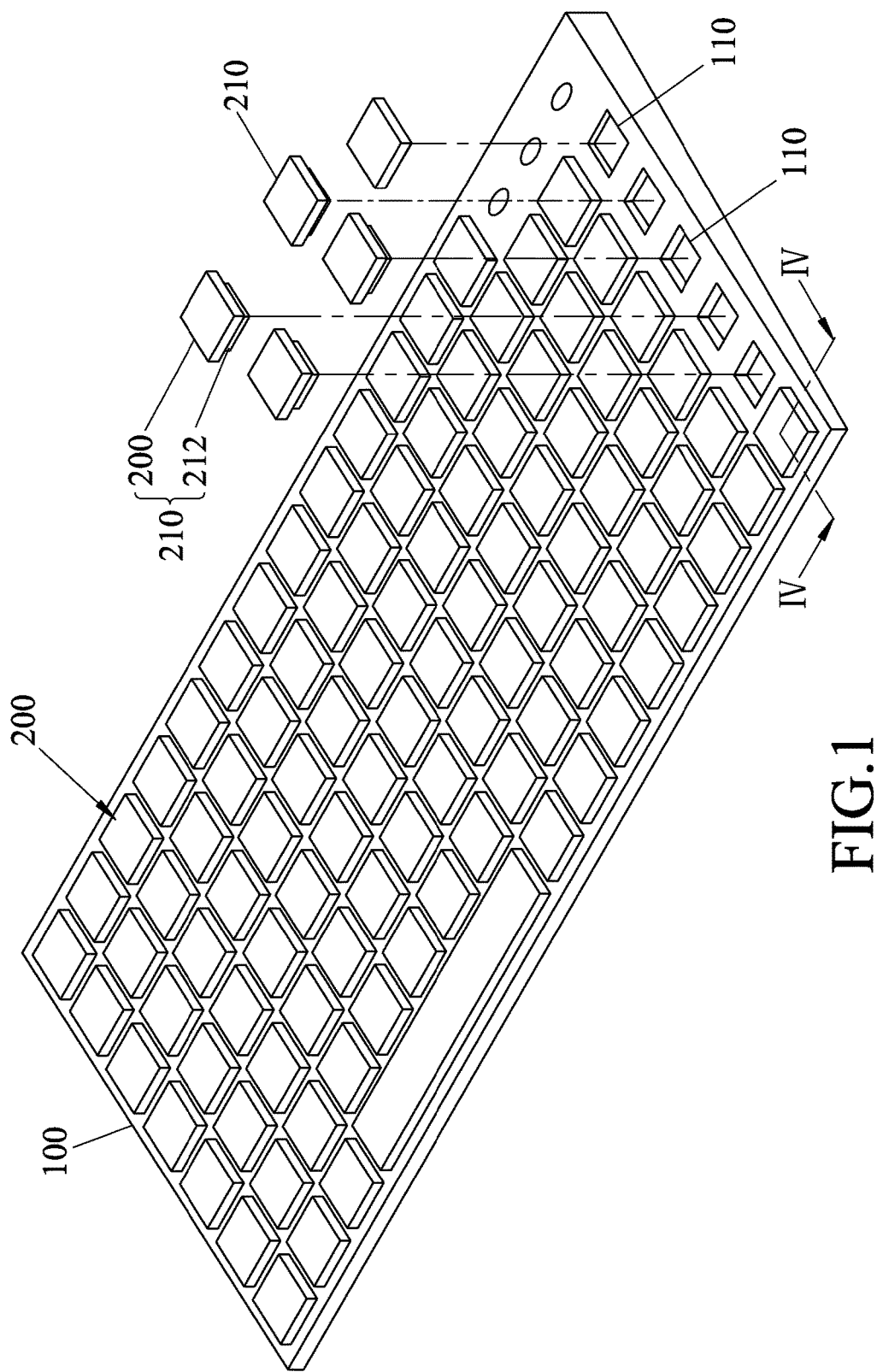
FIG. 1 is schematic perspective, partly exploded view of a keyboard assembly according to one embodiment of this disclosure.
Figure 2:
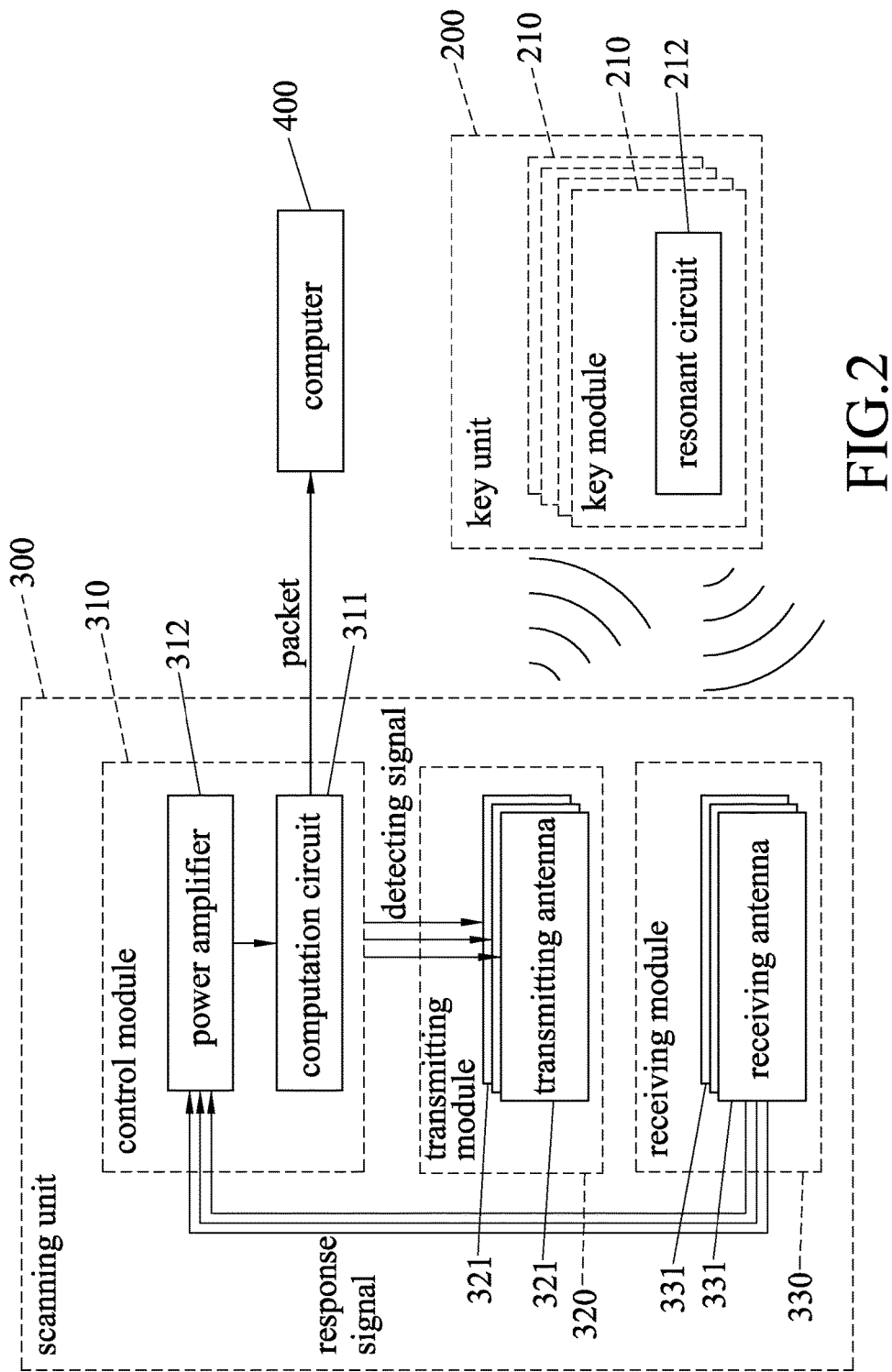
FIG. 2 is a schematic block diagram of the keyboard assembly of FIG. 1.
Figure 3:
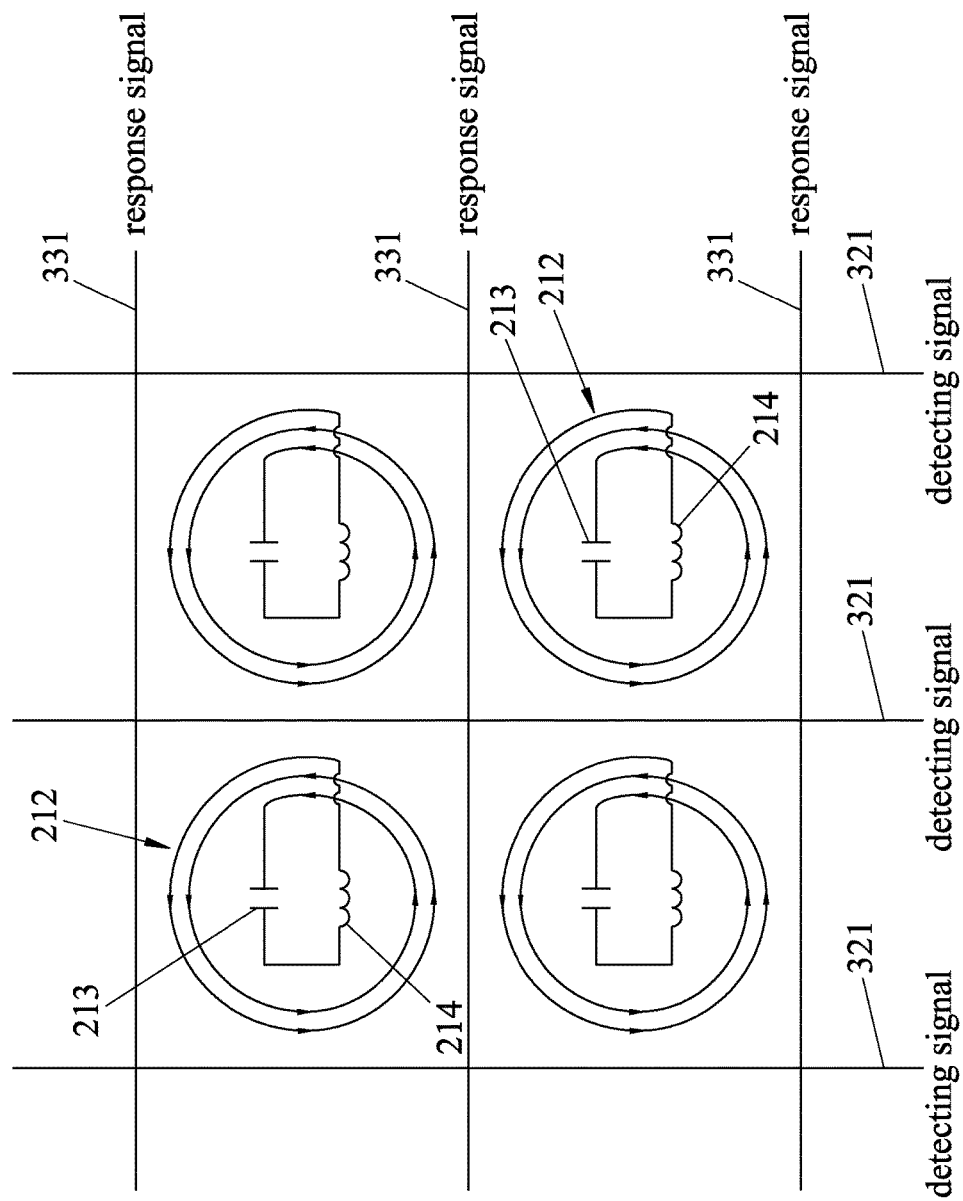
FIG. 3 is a schematic circuit diagram illustrating interaction between a scanning unit and one of a plurality of key modules of the keyboard assembly according to the embodiment of this disclosure.

Referring to FIGS. 1 and 2, a keyboard assembly according to one embodiment of this disclosure includes a chassis 100, a key unit 200 and a scanning unit 300. The chassis 100 is formed with a plurality of cavities 110. The key unit 200 includes a plurality of key modules 210. Each of the key modules 210 is capable of being arbitrarily mounted in one of the cavities 110, has an individual resonant frequency corresponding to a respective one of a plurality of different key codes, and includes a keycap 211 and a resonant circuit 212 connected to the keycap 211. Referring further to FIG. 3, in this embodiment, the resonant circuit 212 of each of the key modules 210 includes a capacitor 213 and an inductor 214 electrically coupled to the capacitor 213. For each key module 210, the capacitance of the capacitor 213 and the inductance of the inductor 214 thereof are configured to cooperatively define the individual resonant frequency of the key module 210.

In this embodiment, all the keycaps 211 have the same height and each column of the cavities 110 formed in the chassis 100 has a depth that increases gradually from a distal side of the chassis 100 that is distal from a user of the keyboard assembly to a proximate side of the chassis 100. After the key modules 210 are respectively mounted in the cavities 110, the keycaps 211 cooperate with the cavities 110 to form a slanting profile and thus provide the user with a relatively ergonomic access to the keyboard assembly. With the height of the keycaps 211 and the depth of the cavities 110 configured in the manner described above, each of the key modules 210 can be mounted to any one of the cavities 110 according to user demand without affecting the slanting profile to be formed in the keyboard assembly. Note that in other embodiments where the keyboard assembly is, for example, a chiclet keyboard which is widely used in notebook computers and which does not have a slanting profile, all the cavities 110 may have the same depth.

Figure 4:
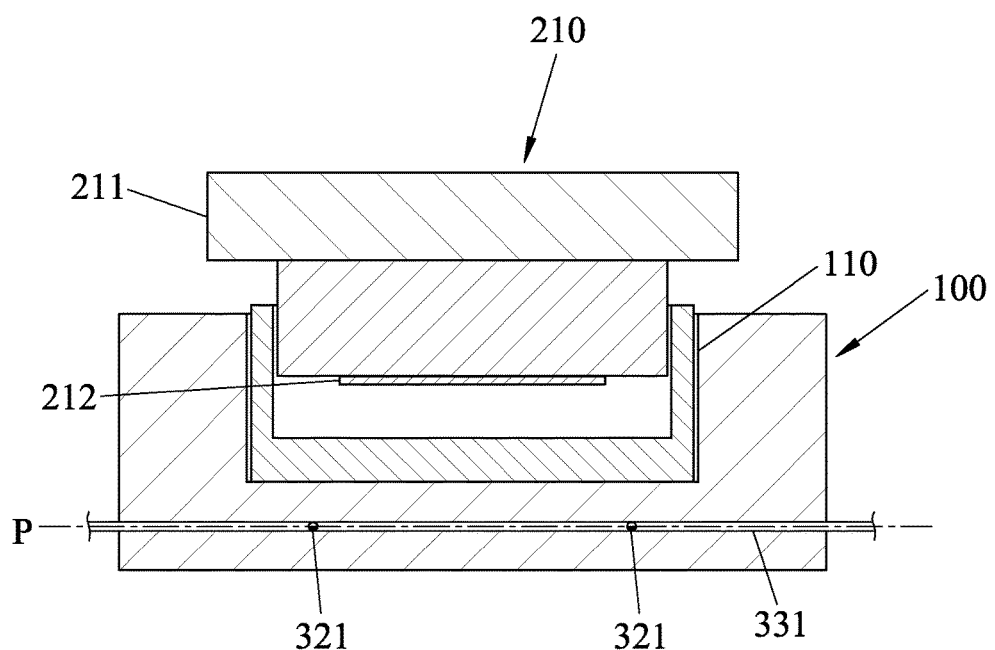
FIG. 4 is a schematic sectional view taken along line IV-IV of FIG. 1.

Further referring to FIGS. 3 and 4, the scanning unit 300 is mounted in the chassis 100 and includes a control module 310, a transmitting module 320 and a receiving module 330. The transmitting module 320 and the receiving module 330 are electrically connected to the control module 310. The transmitting module 320 includes a plurality of transmitting antennas 321 arranged parallel to one another and used to emit a detecting signal. Specifically, the control module 310 repeatedly provides electric signals to the transmitting antennas 321, such that the transmitting antennas 321 repeatedly emit, in response to the electric signal provided by the control module 310, the detecting signal to each of the key modules 210.

In this embodiment, the receiving module 330 includes a plurality of receiving antennas 331 arranged parallel to one another and intersecting the transmitting antennas 321. Particularly, the receiving antennas 331 are arranged transverse to (e.g., perpendicular to) the transmitting antennas 321 in this embodiment. The transmitting antennas 321 cooperate with the receiving antennas 331 to form a scanning plane (P). In one embodiment, the receiving antennas 331 and the transmitting antennas 321 format least one intersection in each of the cavities 110 under the resonant circuit 212 of the key module 210 mounted in the cavity 110.

It is noted herein that the transmitting antennas 321 and the receiving antennas 331 in this embodiment are separate from each other, and by an antenna intersecting another antenna, it is meant that a cross is formed by the two antennas, and not that they actually meet and contact each other, and thus an intersection formed by two antennas as used herein means a point where the two antennas cross as viewed from above.

The scanning unit 300 and the key modules 210 are configured such that, for each of the key modules 210, when a frequency of the detecting signal is one of a plurality of scanning frequencies that matches the individual resonant frequency of the key module 210, the resonant circuit 212 of the key module 210 reaches electromagnetic resonance. Since the receiving antennas 331 are perpendicular to the transmitting antennas 321, the electromagnetic resonance resulting from the detecting signal having the scanning frequency that matches the individual resonant frequency of the key module 210 induces generation of a response signal in the receiving antenna(s) 331 corresponding to the key module 210 (i.e., the corresponding receiving antenna(s) 331 generates the response signal in response to the electromagnetic resonance of the resonant circuit 212), and then the response signal is acquired by the control module 310. The scanning unit 300 records a frequency of the response signal, which is substantially equal to the one of the scanning frequencies.

The control module 310 is configured to determine which one of the keycaps 211 of the key modules 210 is being pressed based on the frequency and intensity of a currently acquired response signal (e.g., by determining, for each of the key modules 210, whether the keycap 211 thereof is being pressed based on the intensity of the response signal of which the frequency matches the individual resonant frequency of the key module 210). The control module 310 is further configured to determine, for each of the key modules 210, a force applied on the keycap 211 of the key module 210 based on the intensity of the response signal corresponding to the key module 210, so that a computer 400 that uses the keyboard assembly may perform different actions corresponding to difference magnitudes of the force thus determined. As shown in FIG. 4, the keycap 211 of each key module 210 is configured to bring the resonant circuit 212 of the key module 210 into movement in a direction perpendicular to the scanning plane (P). For each key module 210, the intensity of the response signal corresponding to the key module 210 has a negative correlation with a distance between the resonant circuit 212 and the scanning plane (P) because a shorter distance leads to less attenuation in the electromagnetic coupling from the resonant circuit 212. That is to say, the shorter the distance, the greater the intensity of the response signal. Accordingly, the force applied on the keycap 211 of the key module 210 corresponding to the response signal may be derived from the intensity of the response signal. In one embodiment, for each key module 210, the distance between the resonant circuit 212 thereof and the scanning plane (P) is 1.6 millimeters (mm) to 2 mm when the keycap 211 is not pressed and is 0 mm to 0.3 mm when the keycap 211 is bottomed out.

It is further noted herein that, although the transmitting antennas 321 and the receiving antennas 331 are separate from each other in this embodiment, a distance therebetween is so small that it can be ignored in comparison to a distance between the resonant circuit 212 and the transmitting/receiving antennas 321/331 and in comparison to a distance of the movement of the resonant circuit 212. Therefore, from such point of view, it can be said that the transmitting antennas 321 and the receiving antennas 331 cooperate to define a scanning "plane" (P) with respect to the resonant circuit 212.

The control module 310 includes a computation circuit 311 configured to generate the electric signals that cause emission of the detecting signals by the transmitting antennas 321, to receive the response signal provided by one of the receiving antennas 331 that is disposed under the resonant circuit 212 reaching electromagnetic resonance, to generate a packet based on the response signal, whose frequency matches one of the individual resonant frequencies, with reference to the correspondences between the individual resonant frequencies of the key modules 210 and the key codes, and to output the packet to the computer 400 that is electrically connected to the keyboard assembly. The packet contains information related to one of the key modules 210 whose keycap 211 is determined as being pressed and information related to the force applied on the keycap 211.

Specifically, the computation circuit 311 determines, based on the correspondence between the key codes and the individual resonant frequencies of the key modules 210, one of the key codes that corresponds to the frequency of the currently received response signal, which is substantially equal to the individual resonant frequency of one of the key modules 210. For the currently received response signal, the computation circuit 311 further compares the intensity of the response signal with a predetermined threshold to determine whether the keycap 211 of the key module 210 that corresponds to the response signal is being pressed. In this embodiment, when the intensity of the response signal is greater than or equal to the predetermined threshold, it is determined that the keycap 211 of the key module 210 corresponding to the response signal is being pressed. After the keycap 211 of the key module 210 corresponding to the response signal is determined as being pressed, the computation circuit 311 calculates the force applied on the key cap 211 based on the intensity of the response signal.

In one embodiment, the control module 310 further includes a power amplifier 312 electrically connected to the receiving module 330 for receiving the response signals therefrom, and electrically connected to the computation circuit 311. The power amplifier 312 is configured to perform amplitude gain compensation on the response signals received thereby before providing compensated response signals to the computation circuit 311.

Take a 104-key keyboard as an example of the keyboard assembly of the disclosure, the number of the cavities 110 and the key modules 210 are both one hundred and four. For example, the resonant circuit 212 of each key module 210 can be configured to have an individual resonant frequency different from that of the resonant circuit 212 of any other key module 210 by at least a predetermined frequency, such as two kilohertz (KHz). The scanning frequencies are defined to correspond to the individual resonant frequencies of the key modules 210. Accordingly, in one example where any sequential two of the individual resonant frequencies of the key modules 210, when arranged in order of magnitude, are two KHz apart, with the smallest individual resonant frequency being 500 KHz, the control module 310 causes the transmitting antennas 321 to emit the detecting signal repeatedly, where a frequency of the detecting signal being one of the scanning frequencies of 500 KHz, 502 KHz, 504 KHz, . . . , and 706 KHz in each repetition (or cycle).

Note that the accuracy of the computation module 311 determining, for each key module 210, whether the key cap 211 thereof is being pressed and the force applied on the key cap 211 is positively correlated to the number of the intersections formed by the transmitting antennas 321 and the receiving antennas 331 in the cavities 110. For example, when two intersections are formed in each cavity 110, there are two hundred and eight intersections for the 104-key keyboard, and these intersections can be formed by twenty-six transmitting antennas 321 and eight receiving antennas 331 (because twenty-six times eight equals two hundred and eight), or formed by fifty-two transmitting antenna 321 and four receiving antennas 331 and the present disclosure is not limited in this respect.

In order to reduce the interference of the detecting signal and the response signal, the control module 310 causes only one of the transmitting antennas 321 to emit the detecting signal at one time. The control module 310 may sequentially acquire the response signal generated by each of the receiving antennas 331, if it is indeed generated, one at a time by using a multiplexer or acquire all of the response signals by using an OR gate. Even if more than one keycap 211 of the key module 210 is pressed, only the keycap 211 of the key module 210 corresponding to the response signal which matches the scanning frequency of the detecting signal and whose intensity is greater than or equal to the predetermined threshold would be considered as being pressed. For example, initially, the first one of the transmitting antennas 321 is used to emit the detecting signal having 500 KHz frequency and the control module 310 acquires the response signal (s) from all of the receiving antennas 331 for subsequent determination and calculation; then, the second one of the transmitting antennas 321 is used to emit the detecting signal having 500 KHz frequency and the control module 310 acquires the response signal (s) from all of the receiving antennas 331 and so forth until all of the transmitting antennas 321 have been used to emit the detecting signal having 500 KHz frequency (i.e., completion of a cycle for 500 KHz). Subsequently, in the next cycle, the transmitting antennas 321 are used to emit the detecting signal whose frequency equals another one of the scanning frequencies in the same manner (i.e., the transmitting antennas 321 are used one by one in sequence to emit the detecting signal having said another one of the scanning frequencies), and so forth until transmission of the detecting signal of all the various frequencies (namely the scanning frequencies, e.g., 500 KHz, 502 KHz, 504 KHz, . . . , and 706 KHz) is performed. Such procedure is also referred to as polling and can be repeated as required.

As a result, the greater the number of the transmitting antennas 321 and the receiving antennas 331, the slower the response of the scanning unit 300. In one embodiment, the scanning unit 300 includes only one transmitting antenna 321 and only one receiving antenna 331 and such scanning unit 300 provides a relatively fast response. However, such configuration may have a relatively low accuracy in determining an operation state (e.g., being pressed or not being pressed) of each key module 210.

In an exemplary operation, when a keycap 211 labeled "A", which belongs to one of the key modules 210 having the individual resonant frequency of 600 KHz, is pressed, the resonant circuit 212 of said one of the key modules 210 is brought to move toward the corresponding intersection on the scanning plane (P) formed by, e.g., the fifth one of the transmitting antennas 321 and the third one of the receiving antennas 331. After the fifth transmitting antenna 321 outputs the detecting signal having 600 KHz frequency, the resonant circuit 212 of said one of the key modules 210 reaches electromagnetic resonance, and then the third receiving antenna 331 generates the response signal which has a frequency of 600 KHz and which is received by the computation circuit 311. Thereafter, the computation circuit 311 determines that the frequency of the response signal, which is 600 KHz, matches the individual resonance frequency corresponding to the key module 210 having the keycap 211 labeled "A", and obtains the key code (e.g., 0x04 in the USB keyboard scan codes), which corresponds to the response signal whose frequency is 600 KHz.

In this embodiment, only when the computation circuit 311 determines that the intensity of the response signal is equal to or larger than the predetermined threshold would the keycap 211 of the key module 210 that corresponds to the response signal be determined as being pressed by the user, so oscillation in the response signal which results from interference generated by nearby antennas or noise may not lead to incorrect determinations. Subsequently, the computation circuit 311 acquires the force applied on the keycap 211 of the key module 210 corresponding to the received response signal based on the intensity of the response signal, and generates and outputs the packet containing information of which one of the key modules 210 whose keycap 211 is determined as being pressed and of the force applied thereon to the computer 400.

To sum up, by virtue of the resonant circuit 212 of each key module 210 that reaches electromagnetic resonance when the (scanning) frequency of the detecting signal matches the individual resonant frequency of the key module 210, the scanning unit 300 acquires the response signal and determines the keycap 211 of which one of the key modules 210 is being pressed based on the response signal with reference to the correspondences between the individual resonant frequencies of the key modules 210 and the key codes. Since each key module 210 includes the keycap 211 and the resonant circuit 212 that are integrated together and has an individual resonant frequency corresponding to a respective one of the key codes, the user of the keyboard assembly of this disclosure can easily rearrange any one of the key modules 210 to a desired cavity 110 without changing the correspondence between the key codes and the characters/symbols/commands through use of a software application. Additionally, the key caps 211 and the cavities 110 can be configured to provide the slanting profile of the keyboard assembly even if the key modules 210 are rearranged according to user demand.

In an embodiment, the disclosure relates to a keyboard assembly including:

a chassis formed with a plurality of cavities;

a key unit including a plurality of key modules each of which is mounted in a respective one of the cavities, and has an individual resonant frequency corresponding to a respective one of a plurality of key codes which are different from one another; and a scanning unit mounted in the chassis and configured to emit a detecting signal repeatedly, a frequency of the detecting signal emitted in each repetition being a different one of a plurality of scanning frequencies;

wherein the scanning unit and the key modules are configured such that, for each of the key modules, when the frequency of the detecting signal is one of the scanning frequencies that matches the individual resonant frequency of the key module, the key module reaches electromagnetic resonance and the scanning unit acquires a response signal corresponding to the key module in response to the electromagnetic resonance of the key module, and records a frequency of the response signal, which is substantially equal to the one of the scanning frequencies.

In a further embodiment, the disclosure relates to at least one of the preceding embodiments, wherein each of the key modules includes a keycap and a resonant circuit connected to the keycap and configured to reach resonance when the frequency of the detecting signal is one of the scanning frequencies that matches the individual resonant frequency of the key module.

In a further embodiment, the disclosure relates to at least one of the preceding embodiments, wherein the scanning unit includes a control module, and a transmitting module and a receiving module that are electrically connected to the control module, the control module configured to control the transmitting module to emit the detecting signal;

wherein the receiving module is configured to generate, for each of the key modules, the response signal corresponding to the key module in response to the electromagnetic resonance of the key module, and to transmit the response signal to the control module; and wherein control module is further configured to determine which one of the keycaps of the key modules is being pressed based on the frequency and intensity of the response signal thus received from the receiving module.

In a further embodiment, the disclosure relates to at least one of the preceding embodiments, wherein the control module is further configured to determine, for each of the key modules, a force applied on the keycap of the key module based on the intensity of the response signal corresponding to the key module.

In a further embodiment, the disclosure relates to at least one of the preceding embodiments, wherein the control module includes a computation circuit configured to output a packet containing information related to one of the key modules whose keycap is determined as being pressed and the force applied thereon; and wherein the information being acquired based on the response signal corresponding to the one of the key modules with reference to the correspondences between the individual resonant frequencies of the key modules and the key codes.

In a further embodiment, the disclosure relates to at least one of the preceding embodiments, wherein the computation circuit is configured to generate the information contained in the packet by, for the response signal received thereby, determining which one of the key modules has the individual resonant frequency matching the frequency of the response signal to obtain one of the key codes that corresponds to the frequency of the response signal, comparing the intensity of the response signal with a predetermined threshold to determine whether the keycap of one of the key modules that corresponds to the response signal is being pressed, and calculating, based on the response signal, the force applied on the keycap of one of the key modules that corresponds to the response signal when the keycap of one of the key modules that corresponds to the response signal is determined as being pressed.

In a further embodiment, the disclosure relates to at least one of the preceding embodiments, wherein the control module further includes a power amplifier electrically connected to the receiving module for receiving the response signal therefrom, and electrically connected to the computation circuit, the power amplifier configured to perform amplitude gain compensation on the response signal received thereby before transmitting the response signal to the computation circuit.

In a further embodiment, the disclosure relates to at least one of the preceding embodiments, wherein the transmitting module includes a plurality of transmitting antennas arranged parallel to one another and transmitting the detecting signal, the receiving module including a plurality of receiving antennas arranged parallel to one another and transverse to the transmitting antennas, and receiving the response signal.

In a further embodiment, the disclosure relates to at least one of the preceding embodiments, wherein the transmitting antennas cooperate with the receiving antennas to form a scanning plane, the keycap of each of the key modules is configured to bring the resonant circuit of the key module into movement along a direction perpendicular to the scanning plane; and wherein, for each of the key modules, the intensity of the response signal corresponding to the key module is related to a distance between the resonant circuit and the scanning plane.

In a further embodiment, the disclosure relates to at least one of the preceding embodiments, wherein the resonant circuit of each of the key modules includes a capacitor having a capacitance and an inductor electrically coupled to the capacitor and having an inductance;

wherein the capacitance and the inductance are configured to cooperatively define the individual resonant frequency of the key module.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A keyboard assembly comprising:
   a chassis formed with a plurality of cavities;
   a key unit including a plurality of key modules each of which is mounted in a respective one of said cavities, and has an individual resonant frequency corresponding to a respective one of a plurality of key codes which are different from one another; and
   a scanning unit mounted in said chassis and configured to emit a detecting signal repeatedly, a frequency of the detecting signal emitted in each repetition being a different one of a plurality of scanning frequencies;
   wherein said scanning unit and said key modules are configured such that, for each of said key modules, when the frequency of the detecting signal is one of the scanning frequencies that matches the individual resonant frequency of said key module, said key module reaches electromagnetic resonance and said scanning unit acquires a response signal corresponding to said key module in response to the electromagnetic resonance of said key module, and records a frequency of the response signal, which is substantially equal to said one of the scanning frequencies.

2. The keyboard assembly as claimed in claim 1, wherein each of said key modules includes a keycap and a resonant circuit connected to said keycap and configured to reach resonance when the frequency of the detecting signal is one of the scanning frequencies that matches the individual resonant frequency of said key module.

3. The keyboard assembly as claimed in claim 2, wherein said scanning unit includes a control module, and a transmitting module and a receiving module that are electrically connected to said control module, said control module configured to control said transmitting module to emit the detecting signal;

wherein said receiving module is configured to generate, for each of said key modules, the response signal corresponding to said key module in response to the electromagnetic resonance of said key module, and to transmit the response signal to said control module; and wherein control module is further configured to determine which one of said keycaps of said key modules is being pressed based on the frequency and intensity of the response signal thus received from said receiving module.

4. The keyboard assembly as claimed in claim 3, wherein said control module is further configured to determine, for each of said key modules, a force applied on said keycap of said key module based on the intensity of the response signal corresponding to said key module.

5. The keyboard assembly as claimed in claim 4, wherein said control module includes a computation circuit configured to output a packet containing information related to one of said key modules whose keycap is determined as being pressed and the force applied thereon; and wherein the information being acquired based on the response signal corresponding to said one of said key modules with reference to the correspondences between the individual resonant frequencies of said key modules and the key codes.

6. The keyboard assembly as claimed in claim 5, wherein said computation circuit is configured to generate the information contained in the packet by, for the response signal received thereby, determining which one of said key modules has the individual resonant frequency matching the frequency of the response signal to obtain one of the key codes that corresponds to the frequency of the response signal, comparing the intensity of the response signal with a predetermined threshold to determine whether said keycap of one of said key modules that corresponds to the response signal is being pressed, and calculating, based on the response signal, the force applied on said keycap of one of said key modules that corresponds to the response signal when said keycap of one of said key modules that corresponds to the response signal is determined as being pressed.

7. The keyboard assembly as claimed in claim 5, wherein said control module further includes a power amplifier electrically connected to said receiving module for receiving the response signal therefrom, and electrically connected to said computation circuit, said power amplifier configured to perform amplitude gain compensation on the response signal received thereby before transmitting the response signal to said computation circuit.

8. The keyboard assembly as claimed in claim 3, wherein said transmitting module includes a plurality of transmitting antennas arranged parallel to one another and transmitting the detecting signal, said receiving module including a plurality of receiving antennas arranged parallel to one another and transverse to said transmitting antennas, and receiving the response signal.

9. The keyboard assembly as claimed in claim 8, wherein said transmitting antennas cooperate with said receiving antennas to form a scanning plane, said keycap of each of said key modules is configured to bring said resonant circuit of said key module into movement along a direction perpendicular to the scanning plane; and wherein, for each of said key modules, the intensity of the response signal corresponding to said key module is related to a distance between said resonant circuit and the scanning plane.

10. The keyboard assembly as claimed in claim 2, wherein said resonant circuit of each of said key modules includes a capacitor having a capacitance and an inductor electrically coupled to said capacitor and having an inductance;

wherein the capacitance and the inductance are configured to cooperatively define the individual resonant frequency of said key module.

* * * * *